(12) United States Patent
Tokumitsu (10) Patent No.: US 9,501,438 B2
(45) Date of Patent: Nov. 22, 2016

(54) INFORMATION PROCESSING APPARATUS INCLUDING CONNECTION PORT TO BE CONNECTED TO DEVICE, DEVICE CONNECTION METHOD, AND NON-TRANSITORY COMPUTER-READABLE RECORDING MEDIUM STORING PROGRAM FOR CONNECTING DEVICE TO INFORMATION PROCESSING APPARATUS

(71) Applicant: FUJITSU LIMITED, Kawasaki-shi, Kanagawa (JP)

(72) Inventor: Yoshiyuki Tokumitsu, Kahoku (JP)

(73) Assignee: FUJITSU LIMITED, Kawasaki (JP)

( * ) Notice: Subject to any disclaimer, the term of this patent is extended or adjusted under 35 U.S.C. 154(b) by 365 days.

(21) Appl. No.: 14/108,740

(22) Filed: Dec. 17, 2013

(65) Prior Publication Data

US 2014/0201401 A1 Jul. 17, 2014

(30) Foreign Application Priority Data

Jan. 15, 2013 (JP) .................. 2013-004422

(51) Int. Cl.
*G06F 13/00* (2006.01)
*G06F 13/36* (2006.01)

(52) U.S. Cl.
CPC .................................... *G06F 13/36* (2013.01)

(58) Field of Classification Search
CPC ..................................................... G06F 13/36
See application file for complete search history.

(56) References Cited

U.S. PATENT DOCUMENTS

| 7,099,969 | B2* | 8/2006 | McAfee | G06F 13/4022 710/107 |
| 7,325,086 | B2* | 1/2008 | Kong | G09G 5/363 345/503 |
| 7,934,032 | B1* | 4/2011 | Sardella | G06F 13/4022 710/104 |
| 2003/0002492 | A1* | 1/2003 | Gallagher | H04L 69/329 370/360 |
| 2005/0240703 | A1* | 10/2005 | Nguyen | G06F 13/405 710/301 |
| 2006/0098581 | A1* | 5/2006 | Kenghe | H04L 49/602 370/252 |
| 2007/0067541 | A1* | 3/2007 | Chang | G06F 13/409 710/307 |
| 2007/0239925 | A1 | 10/2007 | Koishi | |

(Continued)

FOREIGN PATENT DOCUMENTS

| JP | 9-259068 | 10/1997 |
| JP | 2007-280237 | 10/2007 |
| JP | 2008-171291 | 7/2008 |

OTHER PUBLICATIONS

Japanese Office Action mailed Sep. 6, 2016 in related Japanese Application No. 2013-004422.

*Primary Examiner* — Jing-Yih Shyu
(74) *Attorney, Agent, or Firm* — Staas & Halsey LLP (57) ABSTRACT

An information processing apparatus includes: a connection port configured to be capable of attaching a device thereto; an acquisition unit configured to acquire, from a storage unit included in the device, bus-configuration information indicating a bus configuration of the device; and a setting unit configured to set a bus configuration of the connection port based on the bus-configuration information.

7 Claims, 11 Drawing Sheets

(56) References Cited

U.S. PATENT DOCUMENTS

| | | | |
|---|---|---|---|
| 2007/0240204 A1* | 10/2007 | Somekawa | H04L 63/08 726/5 |
| 2008/0126583 A1* | 5/2008 | Mohrmann | H04R 5/02 710/7 |
| 2010/0125683 A1* | 5/2010 | Soeda | G06F 11/3466 710/19 |
| 2012/0016970 A1* | 1/2012 | Shah | G06F 9/45558 709/220 |
| 2012/0159245 A1* | 6/2012 | Brownlow | G06F 11/0712 714/23 |
| 2012/0260015 A1* | 10/2012 | Gay | G06F 13/409 710/301 |
| 2013/0268695 A1* | 10/2013 | Toda | G06F 13/10 710/8 |

* cited by examiner

| x8 | | | |
|---|---|---|---|
| x4 | | x4 | |
| x2 | x2 | x2 | x2 |

FIG. 10

| x4 | x4 | x4 | x4 |
|----|----|----|----|
| x4 | x4 | x8 ||
| x8 || x8 ||
| x8 || x4 | x4 |
| x4 | x8 || x4 |
| x16 ||||
| x2 x2 x2 x2 x2 x2 x2 x2 ||||

FIG. 11

INFORMATION PROCESSING APPARATUS INCLUDING CONNECTION PORT TO BE CONNECTED TO DEVICE, DEVICE CONNECTION METHOD, AND NON-TRANSITORY COMPUTER-READABLE RECORDING MEDIUM STORING PROGRAM FOR CONNECTING DEVICE TO INFORMATION PROCESSING APPARATUS

CROSS-REFERENCE TO RELATED APPLICATION

This application is based upon and claims the benefit of priority of the prior Japanese Patent Application No. 2013-004422, filed on Jan. 15, 2013, the entire contents of which are incorporated herein by reference.

FIELD

Embodiment discussed herein is related to an information processing apparatus, a device connection method, and a computer-readable recording medium storing a program for coupling a device.

BACKGROUND

A technique related to a bus expansion device is disclosed in Japanese Laid-open Patent Publication No. 09-259068 or 2008-171291.

SUMMARY

According to one aspect of the embodiments, an information processing apparatus includes: a connection port configured to be capable of attaching a device thereto; an acquisition unit configured to acquire, from a storage unit included in the device, bus-configuration information indicating a bus configuration of the device; and a setting unit configured to set a bus configuration of the connection port based on the bus-configuration information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Figure 1:
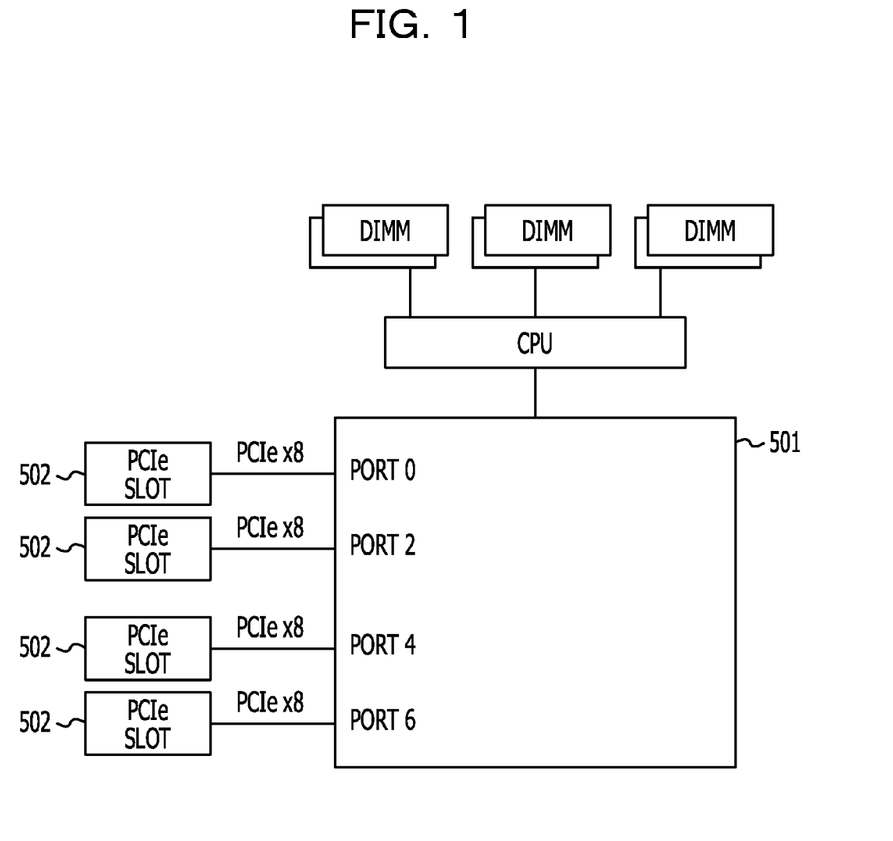
FIG. 1 illustrates an example of a hardware configuration of a PCIe bus expansion device.
Figure 2:
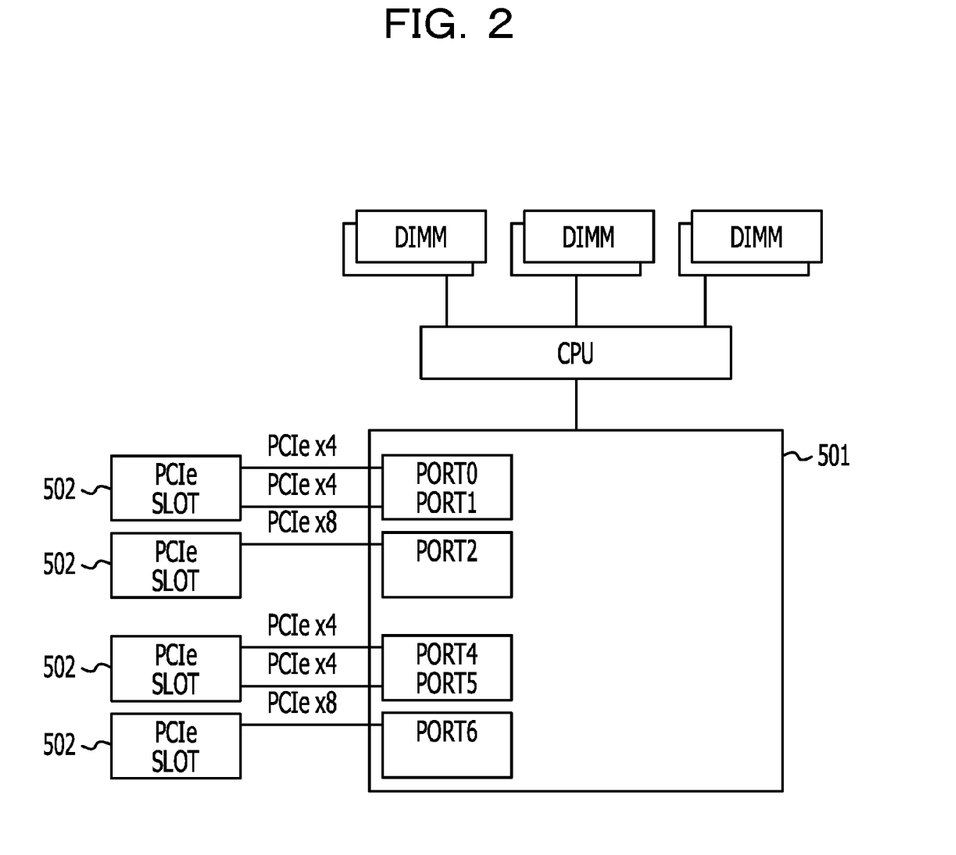
FIG. 2 illustrates an example of the hardware configuration of a PCIe bus expansion device.
Figure 3:
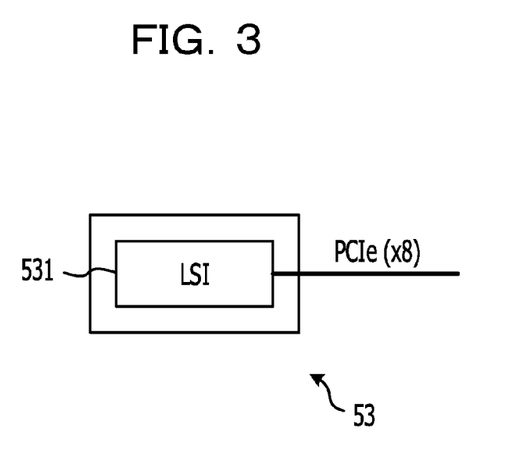
FIG. 3 illustrates an example of a hardware configuration of a PCIe device.
Figure 4:
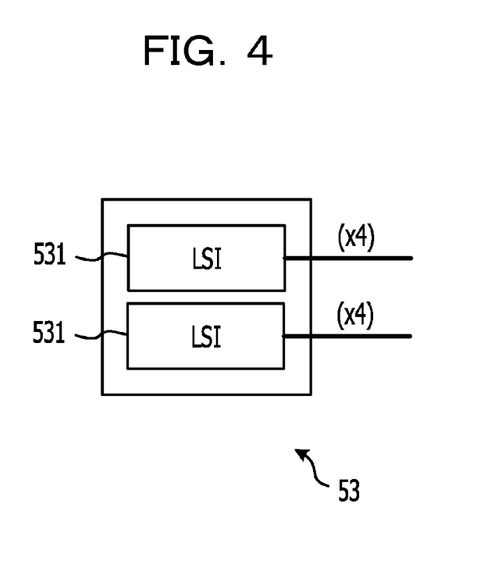
FIG. 4 illustrates an example of a hardware configuration of a PCIe device.
Figure 5:
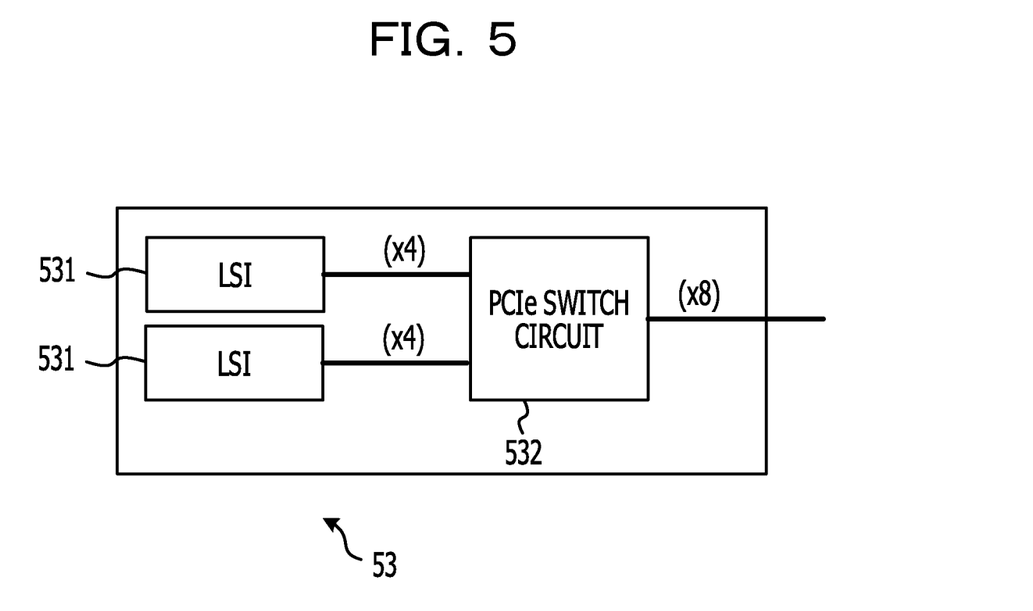
FIG. 5 illustrates an example of a hardware configuration of a PCIe device.

FIGS. 1 and 2 illustrate an example of a hardware configuration of a Peripheral Component Interconnect Express (PCIe) bus expansion device. FIGS. 3 to 5 illustrate an example of hardware configurations of PCIe devices. The bus expansion device having a PCIe interface illustrated in FIG. 1 includes a PCIe switch (or PCIe root port) 501.

The PCIe switch 501 includes four ports to which PCIe slots 502 are coupled. A PCIe device 53 illustrated in FIG. 3 is inserted into any one of the PCIe slots 502 and activated. The PCIe device 53 includes a large scale integration (LSI) 531, and performs various types of functions that are set in advance in the LSI 531. The PCIe device 53 is coupled to the PCIe switch 501 via a PCIe bus so as to be capable of communicating with the PCIe switch 501.

In PCIe, physical transmission paths called lanes are tied in bundles and used, thereby improving data transmission efficiency. A link including a single lane is called an x1 link. For example, a link including two lanes is called an x2 link, and a link including four lanes is called an x4 link. PCIe is set so as to be capable of supporting interfaces having different widths such as x1, x2, x4, x8, x12, x16, and x32. Thus, different bandwidth requirements of various peripheral devices are satisfied.

In PCIe, the PCIe device 53 is coupled to the PCIe switch 501 with an interface having a number of lanes (lane width) that is any one of x1, x2, x4, x8, x16, and x32. In FIG. 3, the PCIe device 53 having an x8 link is illustrated. The PCIe switch 501 has a port bifurcation function capable of setting the number of lanes that a port has. With the port bifurcation function, for example, one port having eight lanes (hereinafter, referred to as an "x8 port") is divided into two ports each having four lanes (hereinafter, referred to as "x4 ports"), and used.

Referring to FIG. 2, a port 0 that is an x8 port illustrated in FIG. 1 is divided into ports 0 and 1 that are two x4 ports, and a port 4 that is an x8 port illustrated in FIG. 1 is divided into ports 4 and 5 that are two x4 ports. Regarding each port, a PCIe device 53 having a number of lanes that is equal to or smaller than the number of lanes of the port is inserted into the port. For example, a PCIe device 53 having an x4 link is inserted into an x4 port, and a PCIe device 53 having an x8 link is inserted into an x8 port.

In the bus expansion device, as illustrated in FIG. 4, when a PCIe device 53 having two LSIs 531 that are each coupled to an x4 PCIe bus inserted into an x8 PCIe slot 502 and is activated, only either one of the LSIs 531 may be recognized in accordance with the specification of PCIe. In order to cause the PCIe switch 501 side to recognize the two LSIs 531 included in the same PCIe device 53 described above, as illustrated in FIG. 5, a PCIe switch circuit 532 is provided in the PCIe device 53, and the two LSIs 531 are coupled via this PCIe switch circuit 532.

The production cost may increase because the PCIe switch circuit 532 is implemented in the PCIe device 53. In addition, the access performance may decrease because of latency that occurs in the PCIe switch circuit 532.

An embodiment described below is only an example, and various modification examples or techniques that are not clearly described in the embodiment may be applied. In each figure, not only components illustrated in the figure but also other functions and so forth may be included.

Figure 6:
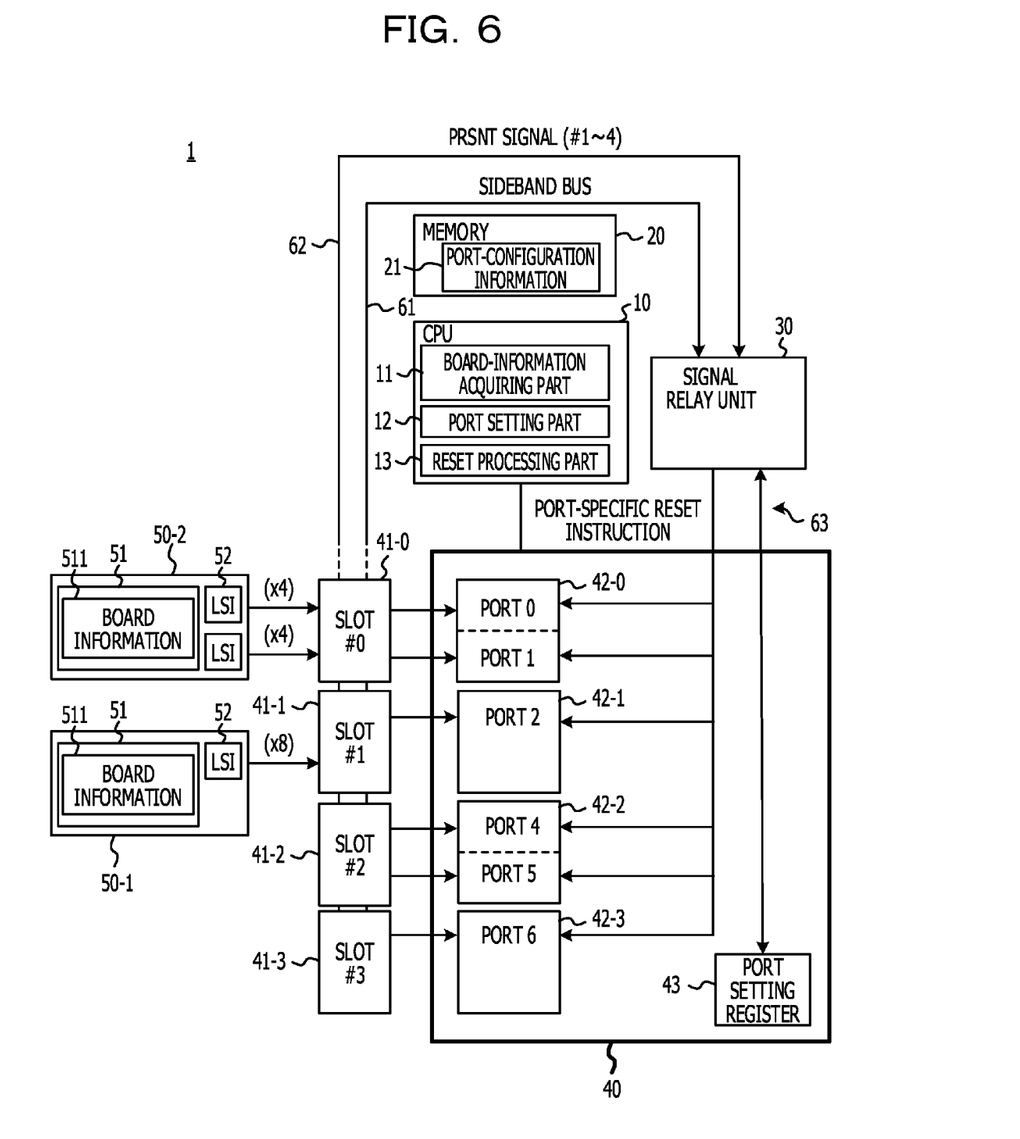
FIG. 6 illustrates an example of an information processing apparatus.

FIG. 6 illustrates an example of an information processing apparatus. An information processing apparatus 1 illustrated in FIG. 6 includes a central processing unit (CPU) 10, a memory 20, a signal relay unit 30, a PCIe switch (input and output control switch) 40, and at least one slot, for example, (four slots in the example illustrated in FIG. 1) slots 41-0 to 41-3. The slots 41-0 to 41-3 are coupled to physical ports 42-0 to 42-3 of the PCIe switch 40 via PCIe buses (main band buses) so as to be capable of communicating with the physical ports 42-0 to 42-3, respectively.

The slots 41-0 to 41-3 are coupled to the signal relay unit 30 via a PRSNT signal line 62 and a sideband bus 61. The sideband bus 61 may be a bus different from a PCIe bus, such as a System Management (SM) bus or an Inter-Integrated Circuit (I2C) bus. I/O devices (boards or expansion devices) 50-1 and 50-2 may be detachably attached to the slots 41-0 to 41-3. Each of the slots 41-0 to 41-3 includes a connector, for example, a female connector or a host connector. Connectors (male connectors; connection portions) 54 of the I/O devices 50-1 and 50-2 (see FIGS. 7 and 8) may be inserted into the connectors.

The size of a PCIe slot differs in accordance with the bandwidth thereof. In PCIe, an I/O device on which a narrow connector 54 is mounted may be coupled to a wide host connector (slot) mounted on a mother board. For example, a device connector having an x1 link or x4 link has may be inserted into a host connector having an x8 link. PCIe slots may have downward compatibility.

Figure 7:
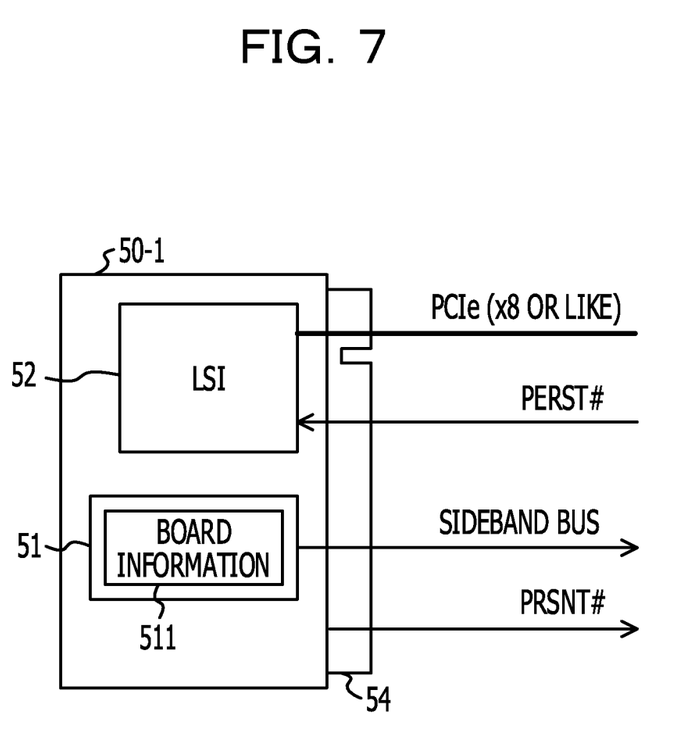
FIG. 7 illustrates an example of an I/O device.
Figure 8:
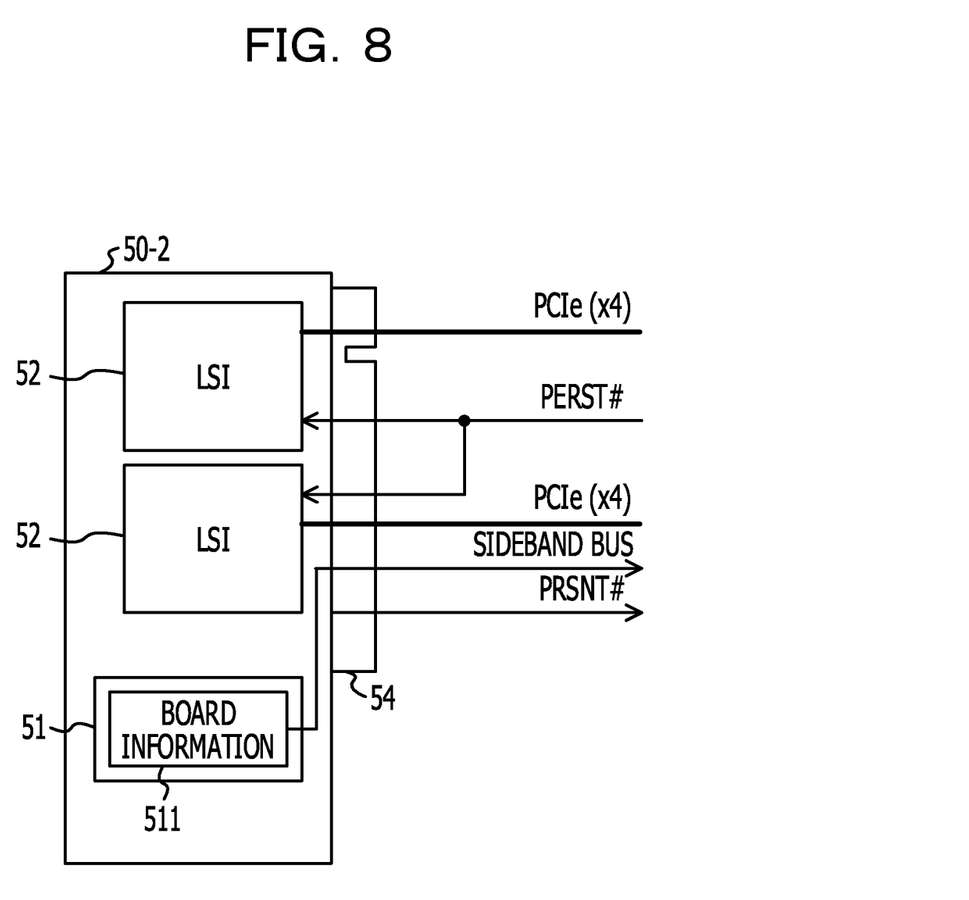
FIG. 8 illustrates an example of an I/O device.

FIGS. 7 and 8 illustrate an example of an I/O device. The I/O devices 50-1 and 50-2 illustrated in FIGS. 7 and 8 may be coupled to, for example, the information processing apparatus 1 illustrated in FIG. 6. The I/O device 50-1 illustrated in FIG. 7 includes a read-only memory (ROM) 51, a connector 54, and one LSI 52. By inserting and attaching the connector 54 to any one of the slots 41, the I/O device 50-1 is coupled to the corresponding physical port 42 of the PCIe switch 40. The LSI 52 may have an x8 PCIe bus (main band bus), and may be coupled to an external device such as the PCIe switch 40.

The I/O device 50-2 illustrated in FIG. 8 includes a ROM 51, a connector 54, and two LSIs 52. By inserting and attaching the connector 54 to any one of the slots 41, the I/O device 50-2 is coupled to the corresponding physical port 42 of the PCIe switch 40. Regarding the I/O device 50-2, each of the two LSIs 52 may have an x4 PCIe bus, and may be coupled to an external device such as the PCIe switch 40.

The connector 54 of the I/O device 50-1 and the connector 54 of the I/O device 50-2 may have substantially the same shape or similar shapes. As a reference numeral denoting an I/O device, in the case of identifying one of the multiple I/O devices, reference numeral 50-1 or 50-2 is used, and, in the case of identifying any one of the I/O devices, reference numeral 50 is used.

A PCIe reset (PERST#) signal may be input to each of the I/O devices 50. In a state in which the PERST# signal is input to the I/O device 50, the I/O device 50 enters a state in which the potential thereof is reset, for example, an asserted state. In a state in which reset performed by inputting the PERST# signal is released, the I/O device 50 enters a negated state. For example, in a state in which the I/O device 50 is attached to any one of the slots 41, the PCIe reset (PERST#) signal is input via the slot 41 to the I/O device 50.

The I/O devices 50 have a function of outputting a PRSNT# signal. Regarding each of the I/O devices 50, in a state in which the I/O device 50 is coupled to any one of the slots 41, the I/O device 50 notifies the PCIe switch 40 of an insertion state of the I/O device 50. The PRSNT# signal is input from each of the slots 41 via the PRSNT signal line 62 to the signal relay unit 30.

Each of the I/O devices 50 has the ROM 51. Board information 511 is stored in the ROM 51. The board information 511 is information indicating a bus configuration of the I/O device 50. For example, the board information 511 includes identification information by which the I/O device 50 is identified, and information indicating the number of lanes included in a link of each PCIe bus that the I/O device 50 has.

Regarding each of the I/O devices 50, in a state in which the I/O device 50 is coupled to any one of the slots 41-0 to 41-3, the I/O device 50 is coupled to the signal relay unit 30 via the sideband bus 61. In the state in which the I/O device 50 is coupled to any one of the slots 41-0 to 41-3, the board information 511 stored in the ROM 51 is read by a board-information acquisition part 11 of the CPU 10 via the sideband bus 61 and the signal relay unit 30.

The slots 41-0 to 41-3 are provided so as to correspond to the physical ports 42-0 to 42-3, respectively, of the PCIe switch 40. The number of slots 41 that is the same as the number of physical ports 42 which are the physical ports 42-0 to 42-3 may be provided. Each of the slots 41-0 to 41-3 is coupled to a corresponding one of the physical ports 42-0 to 42-3 via a PCIe bus (a main band bus) so as to be capable of communicating with the physical port 42. For example, the slot 41-0 is coupled via a PCIe bus to the physical port 42-0, and the slots 41-1 to 41-3 are coupled via PCIe buses to the physical ports 42-1 to 42-3, respectively.

By inserting the I/O devices 50-1 and 50-2 into the slots 41-0 to 41-3, the I/O devices 50-1 and 50-2 are coupled to the physical ports 42-0 to 42-3 so as to be capable of communicating with the physical ports 42-0 to 42-3, and communication is performed in accordance with the standard of PCIe. The individual slots 41-0 to 41-3 may have substantially the same configuration or similar configurations. As a reference numeral denoting a slot, in the case of identifying one of the multiple slots, a corresponding one of reference numerals 41-0 to 41-3 is used, and, in the case of identifying any one of the slots, reference numeral 41 is used. The slots 41-0 to 41-3 may be referred to as slots #0 to #3.

In a state in which one of the I/O devices 50 is coupled to one of the slots 41, the board-information acquisition part 11 of the CPU 10 reads the board information 511, which is stored in the ROM 51 of the I/O device 50, via the signal relay unit 30 and the sideband bus 61. The PCIe switch 40 may have a fan-out function which distributes a signal transmitted on any one of the PCIe buses to multiple units. As illustrated in FIG. 6, the PCIe switch 40 includes at least one physical port, for example, four physical ports (connection ports) that are the physical ports 42-0 to 42-3, and a port setting register 43.

Each of the physical ports 42-0 to 42-3 may be a set of transmitters and receivers that form one end of a link of PCIe, and may include a number of transmitters and receivers that corresponds to the number of lanes included in the link, for example, 8. The physical ports 42-0 to 42-3 may have substantially the same configuration or similar configurations. As a reference numeral denoting a physical port, in the case of identifying one of the multiple physical ports, a corresponding one of reference numerals 42-0 to 42-3 is used, and, in the case of identifying any one of the physical ports, reference numeral 42 is used.

Regarding each of the physical ports 42, when one of the I/O devices 50 is coupled to the slot 41 corresponding to the physical port 42, the transmitters of the physical port 42 are coupled to receivers of the I/O device 50. Similarly, when one of the I/O devices 50 is coupled to the slot 41 corresponding to the physical port 42, the receivers of the physical port 42 are coupled to transmitters of the I/O device 50. The I/O device 50 that is coupled to the slot 41 and the physical port 42 may be coupled to each other so as to be capable of communicating with each other.

The physical port 42 and the I/O device 50 are coupled to each other via multiple lanes, for example, eight lanes. The PCIe switch 40 of the information processing apparatus 1 may have a port division function (port bifurcation function) of dividing each of the physical ports 42 into multiple logical ports (hereinafter, simply referred to as "ports").

Figure 9:
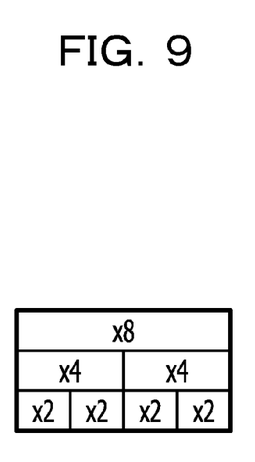
FIG. 9 illustrates an example of port division.
Figure 10:
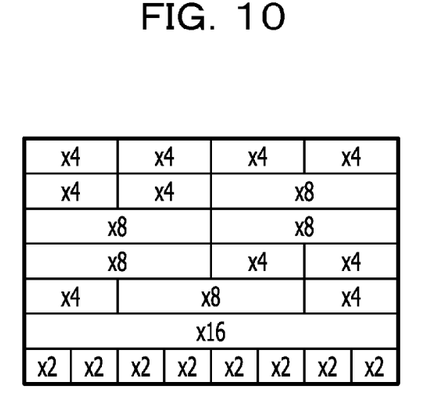
FIG. 10 illustrates an example of port division.

FIGS. 9 and 10 illustrate an example of a port division. FIGS. 9 and 10 illustrate the port division of the information processing apparatus 1 illustrated in FIG. 6. Referring to FIG. 9, among the physical ports 42, a physical port 42 having eight lines is divided into ports. Referring to FIG. 10, among the physical ports 42, a physical port 42 having sixteen lines is divided into ports. In the port division function, multiple lines that each of the physical ports 42 has are divided into bundles each having a given number of lines, and the bundles of lines are treated as multiple ports. For example, in the port division function, eight lines that the physical port 42 illustrated in FIG. 9 has are divided into, for example, multiple ports having x2 or x4 lines. In the case where a physical port 42 among the physical ports 42 has sixteen lines, for example, as illustrated in FIG. 10, the sixteen lines are divided into multiple ports that are ports having x2 lines, ports having x4 lines, or ports having x8 lines.

Referring to FIG. 6, the physical port 42-0 is divided into two ports that are ports 0 and 1, and the physical port 42-2 is divided into two ports that are ports 4 and 5. In the case of division of each of the physical ports 42, a port setting part 12 of the CPU 10 sets and registers a division state of the physical port 42 as a register set value in the port setting register 43.

The port setting register 43 is a storage device that stores the set value for the port division function, and may be a memory or the like. The port setting part 12 sets a port setting for each of the physical ports 42 based on the value of the port setting register 43. The signal relay unit 30 relays data among the CPU 10, the slots 41, and the PCIe switch 40. For example, the signal relay unit 30 passes, via the sideband bus 61, on to the CPU 10, the board information 511 that has been read from the ROM 51 of one of the I/O devices 50. The signal relay unit 30 passes, via the PRSNT signal line 62, on to the CPU 10, the PRSNT# signal that has been input from any one of the I/O devices 50. The signal relay unit 30 is coupled to the PCIe switch 40 via a sideband bus 63.

The signal relay unit 30 stores (registers), in the port setting register 43 via the sideband bus 63, for example, the register set value that has been output from the CPU 10. The signal relay unit 30 supplies, for example, a port-specific reset instruction that has been output in accordance with an instruction provided by the reset processing part 13 of the CPU 10, to a corresponding one of the ports of the PCIe switch 40. The signal relay unit 30 may be, for example, a chip including a circuit configured to transfer data.

The memory 20 may be a storage device including a ROM and a random-access memory (RAM). In the ROM of the memory 20, a software program for port configuration control, data used for a program or the like is stored. The software program stored in the memory 20 is appropriately read and executed by the CPU 10. The RAM of the memory 20 may be utilized as a primary storage memory or a working memory.

In the memory 20, port-configuration information (state information) 21 is stored. The port-configuration information 21 is information indicating the division state of each of the physical ports 42. For example, for each of the physical ports 42, information concerning whether or not the physical port 42 is divided into ports or information concerning lanes (for example, the number of lanes) of each of the divided ports may be stored as the port-configuration information 21. The CPU 10 may be a processing device that performs various types of control or calculation. The CPU 10 executes an operating system (OS) or a program stored in the memory 20 or the like, thereby realizing various types of functions. For example, as illustrated in FIG. 6, the CPU 10 may function as the board-information acquisition part (an acquisition unit) 11, the port setting part 12 (a setting unit), and the reset processing part 13.

The CPU 10 of the information processing apparatus 1 executes a port setting program, whereby the CPU 10 may function as the board-information acquisition part 11, the port setting part 12, and the reset processing part 13. A program (the port setting program) for realizing the functions of the board-information acquisition part 11, the port setting part 12, and the reset processing part 13 may be supplied in a state of being recorded on a computer-readable recording medium, such as a Compact Disc (CD) (a Compact Disc Read-Only Memory (CD-ROM), a Compact Disc Recordable (CD-R), a Compact Disc ReWritable (CD-RW), or the like), a Digital Versatile Disc (DVD) (Digital Versatile Disc Read-Only Memory (DVD-ROM), Digital Versatile Disc Random-Access Memory (DVD-RAM), Digital Versatile Disc Recordable (DVD-R), Digital Versatile Disc Recordable (DVD+R), Digital Versatile Disc ReWritable (DVD-RW), Digital Versatile Disc ReWritable (DVD+RW), High-Definition Digital Versatile Disc (HD DVD), or the like), a Blue-ray Disc, a magnetic disk, an optical disk, a magneto-optical disk, or the like. A computer reads a program from the recording medium, transfers the program to an internal storage device or external storage device, and stores the program in the internal storage device or external storage device. A program may be recorded in a storage device (a recording medium) such as a magnetic disk, an optical disk, or a magneto-optical disk, and supplied from the storage device via a communication path to the computer.

In the case of functioning as the board-information acquisition part 11, the port setting part 12, and the reset processing part 13, a program stored in the internal storage device, for example, the memory 20, may be executed by a microprocessor of the computer, for example, the CPU 10. A program stored on the recording medium may be read by the computer, and may be executed.

Note that, in the present embodiment, the computer may include hardware and an operating system, and may be hardware that operates under control of the operating system. When no operating system is present and an application program singly causes the hardware to operate, the hardware may correspond to the computer. The hardware may include at least a microprocessor, such as a CPU, and a unit configured to read a computer program recorded on a recording medium, and the information processing apparatus 1 may have the functions of the computer.

The board-information acquisition part 11 reads the board information 511 from the ROM 51 of one of the I/O devices 50 via the signal relay unit 30 and the sideband bus 61.

When one of the I/O devices 50 is inserted into one of the slots 41 into which no I/O device is inserted and the PRSNT# signal is input, the board-information acquisition part 11 reads the board information 511 from the ROM 51 of the I/O device 50 that has been inserted into the slot 41.

The board information 511 that has been read by the board-information acquisition part 11 is stored in, for example, a certain region of the memory 20. The port setting part 12 sets a port setting for the PCIe switch 40. The port setting part 12 compares the board information 511 concerning the I/O device 50, which has been acquired from the I/O device 50 by the board-information acquisition part 11, and the port-configuration information 21, which has been acquired from the memory 20, concerning the corresponding physical port 42 to which the I/O device 50 is coupled.

The port setting part 12 determines, based on a result of comparison, whether or not it is desirable that the port configuration (port bifurcation) be changed. For example, when the board information 511 and the port-configuration information 21 do not indicate substantially the same state, the port setting part 12 may determine that it is desirable that the port configuration be changed. When the board information 511 and the port-configuration information 21 indicate substantially the same state, the port setting part 12 may determine that it is not desirable that the port configuration be changed.

For example, the number of lanes (for example, x8, or x4 and x4) of the I/O device 50 that is indicated by the board information 511 acquired from the I/O device 50 and the number of lanes (for example, x4 and x4 or another number of lanes) of each of the ports of the physical port 42 that is indicated by the port-configuration information 21 are compared with each other. As a result of comparison, for example, the board information 511 may indicate that the number of lanes is eight, for example, the I/O device 50 has one x8 link, and the port-configuration information 21 may indicate that the physical port 42 corresponding to the slot 41 into which the I/O device 50 is inserted is divided into two x4 links (x4 and x4). Because the board information 511 and the port-configuration information 21 do not indicate the same state, the port setting part 12 may determine that it is desirable that the port configuration be changed.

For example, the board information 511 may also indicate that the I/O device 50 has two x4 links (x4 and x4), and the port-configuration information 21 may indicate that the physical port 42 corresponding to the slot 41 into which the I/O device 50 is inserted has also two x4 links. The board information 511 and the port-configuration information 21 indicate substantially the same state. The port setting part 12 determines that it is not desirable that the port configuration be changed.

When the port setting part 12 determines, based on a result of comparison, that it is desirable that the port configuration be changed, the port setting part 12 changes the port configuration of the physical port 42 to which the I/O device 50 is coupled so that the port configuration matches the board information 511. The port configuration is changed by, for example, changing the value of the port setting register 43 via the signal relay unit 30. The port configuration of PCIe may be changed using a known scheme.

The reset processing part 13 resets each of the ports. The reset processing part 13 supplies the PCIe reset (PERST#) signal to each of the ports, thereby resetting the port. The reset processing part 13 provides a reset instruction (a port-specific reset instruction) with a port whose configuration has been changed by the port setting part 12, thereby resetting the ports on a port-by-port basis. The reset instruction may be provided by supplying a reset signal to the physical port 42 corresponding to each of the ports. The reset processing part 13 may set, for example, using software control, a certain value indicating reset of each of the ports in a storage device, such as the port setting register 43.

Figure 11:
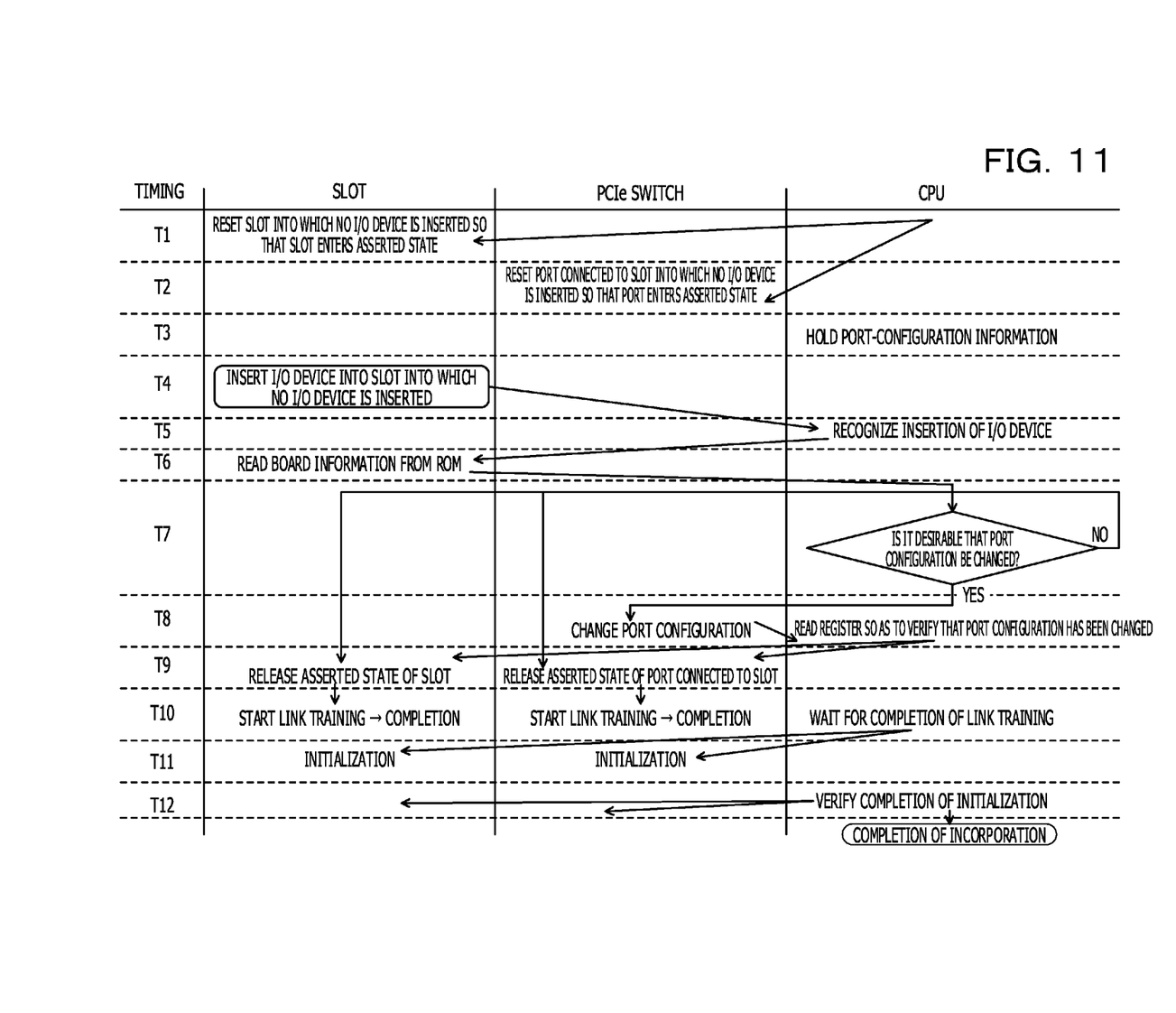
FIG. 11 illustrates an example of a process of attaching and activating an I/O device.

FIG. 11 illustrates an example of a process of attaching and activating an I/O device. An I/O device illustrated in FIG. 11 may be any one of the I/O devices illustrated in FIG. 6. In the PCIe switch 40, regarding the slots 41 to which no I/O device 50 is attached, for examples, the slots 41 into which no I/O device 50 is inserted, the asserted state of the slots 41 is maintained based on an instruction provided by the CPU 10 (timing T1). The asserted state of each of the ports is maintained based on an instruction provided by the reset processing part 13 (timing T2).

In the memory 20, the port-configuration information 21 indicating the current state of the port configuration of each of the physical ports 42 of the PCIe switch 40 is stored (timing T3). The order in which the process of setting the slots 41 and the ports to be in the asserted state and the process of storing the port-configuration information 21 are performed is not limited to the above-described order. The order of the processes may be appropriately changed so that the processes will be replaced with each other, or at least portions of the processes may be performed in parallel. At timing T4, when one of the I/O devices 50 is inserted into one of the slots 41 into which no I/O device 50 is inserted, the PRSNT# signal is supplied from the I/O device 50 via the PRSNT signal line 62 and the signal relay unit 30 to the CPU 10. At timing T5, the CPU 10 recognizes, based on the PRSNT# signal, that the I/O device 50 is inserted in the slot 41.

At timing T6, the board information acquiring part 11 reads and acquires the board information 511 from the ROM 51 of the I/O device 50 via the signal relay unit 30 and the sideband bus 61. The port setting part 12 recognizes, based on the acquired board information 511, a type related to PCIe of the I/O device 50, for example, the number of lanes. At timing T7, the port setting part 12 determines whether or not it is desirable that the port configuration be changed, based on the number of lanes of the I/O device 50, which has been acquired from the board information 511, and the number of lanes of the port corresponding to the slot 41 into which the I/O device 50 is inserted, which is included in the port-configuration information 21 stored in the memory 20. For example, the port setting part 12 may determine whether or not the number of lanes of the I/O device 50 acquired from the board information 511 and the number of lanes of the port included in the port-configuration information 21 match.

When the number of lanes of the I/O device 50 acquired from the board information 511 and the number of lanes of the port included in the port-configuration information 21 do not match, for example, when it is determined that it is desirable that the port configuration be changed (see a "YES" arrow at timing T7), at timing T8, the port setting part 12 changes the port configuration of the PCIe switch 40. For example, the port setting part 12 changes the value of the port setting register 43 via the sideband bus 63. For example, among the physical ports 42, one physical port 42 having an x8 link may be divided into two ports each having an x4 link (x4 and x4). After the port setting part 12 has changed the port configuration, the port setting part 12 reads the value of the port setting register 43 (register read), and verifies that the port configuration has been changed correctly.

The reset processing part 13 resets the port for which the port configuration has been changed by the port setting part 12, and causes the port to enter the asserted state (in which the port is kept being reset). At timing T9, the reset processing part 13 releases the asserted state of the slot 41 and the port into which the I/O device 50 is inserted. Also when it is determined at timing T7 that it is not desirable that the port configuration be changed (see a "NO" arrow at timing T7), at timing T9, the reset processing part 13 releases the asserted state of the slot 41 and the port into which the I/O device 50 is inserted.

At timing T10, a PCIe link training for the slot 41 and the port starts. The PCIe link training for the slot 41 and the port may be autonomously performed based on a function of the PCIe switch 40. The CPU 10 waits for completion of the PCIe link training. The PCIe link training may be completed within one second based on the standard of PCIe. At timing T11, an initialization process of initializing a PCIe device, such as an assign of a bus number, a device number, and a function number or setting of a base address, may be performed for the slot 41 and the port.

At timing T12, the CPU 10 verifies that the initialization process for the slot 41 and the port has been completed, and finishes the process. In the information processing apparatus 1, the board information acquiring part 11 acquires, from the ROM 51 of the I/O device 50 coupled to the slot 41, the board information 511 indicating the number of lanes of the I/O device 50. The port setting part 12 compares the board information 511 and the port-configuration information 21 indicating the number of lanes of the port of the PCIe switch 40, which is stored in the memory 20, with each other. The port setting part 12 determines whether or not it is desirable that the port configuration be changed. When it is determined that it is desirable that the port configuration be changed, the port setting part 12 changes the port configuration so that the port configuration matches the board information 511.

The numbers of lanes of the ports are changed so as to match the numbers of lanes of the I/O devices 50, and the I/O devices 50 having different lane configurations are attached to the slots 41 and used. The convenience may increase. For example, the slots 41 may be coupled to both the I/O device 50-1, which includes one LSI 52 and one x8 link illustrated in FIG. 7, and the I/O device 50-2, which includes multiple LSIs 52 and multiple x4 links illustrated in FIG. 8. In the information processing apparatus 1, both of the multiple LSIs 52 included in the I/O device 50-2 may be recognized.

The I/O devices 50 having different bus configurations are coupled to the ports of the PCIe switch 40, and are used. Thus, the convenience may increase. An operation having a high degree of flexibility in accordance with the configuration of each of the I/O devices 50 may be performed. For example, no switch circuit configured to change the number of lanes may be included in the I/O devices 50. Thus, an increase in latency or production cost due to provision of a switch circuit may be reduced.

For example, any one of the I/O device 50-1 having an x8 link and the I/O device 50-2 having two x4 links may be selected and attached to a physical port 42 having an x8 link among the physical ports 42.

For example, the physical ports 42 may have a configuration other than a configuration having an x8 link. The I/O devices 50 may have a configuration other than a configuration having two x4 links. The PCIe switch 40 may be included in the information processing apparatus 1, or a PCIe root port may be provided instead of the PCIe switch 40.

The above-described embodiment may be applied to an information processing apparatus including the PCIe switch 40 based on the standard of PCIe, and may be applied to a bus device conforming to a standard other than PCIe.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus comprising:
   a processor configured to execute a program;
   a memory configured to store the program;
   a sideband bus;
   a signal line;
   connection ports configured to be attached to a device which receives, from the processor, a reset signal via the signal line, outputs, to the processor, a coupling state of whether the device is coupled to the connection port via the signal line and outputs, to the processor, bus-configuration information indicating a bus configuration of the device via the sideband bus; and
   a state-information storage unit,
   wherein the processor, based on the program, performs operations to:
      acquire, from a storage unit included in the device, the bus-configuration information via the sideband bus when receiving the coupling state indicating that the device has been coupled to the connection port via the signal line; and
      set a bus configuration of the connection port based on the bus-configuration information;
   wherein the state-information storage unit is configured to store state information indicating a setting state of the bus configuration of the connection port,
   wherein the processor compares the state information and the bus-configuration information and changes the bus configuration of the one or more connection ports based on a comparison result,
   wherein the processor changes the bus configuration of the one or more connection ports by changing a value in a port setting register the connection port so that the bus configuration of the connection port matches the bus-configuration information when the state information and the bus-configuration information do not match each other; and
   wherein the processor, after changing the bus configuration of the one or more connection ports, is configured to read the value port setting register whose value has been changed to verify the changing and supply the reset signal to the one or more connection ports individually.

2. The information processing apparatus according to claim 1,
   wherein the processor is configured to reset the one or more connection ports.

3. The information processing apparatus according to claim 1,
wherein the processor is configured to acquire the bus-configuration information via the sideband bus from the storage unit.

4. A device connection method comprising:
acquiring, from a storage unit included in a device which receives, from a processor in an information processing apparatus, a reset signal via a signal line in the information processing apparatus, outputs, to the processor, a coupling state of whether the device is coupled to respective connection ports in the information processing apparatus via the signal line and outputs, to the processor, bus-configuration information indicating a bus configuration of the device via a sideband bus in the information processing apparatus, the bus-configuration information indicating a first bus configuration of the device via the sideband bus when receiving the coupling state indicating that the device has been coupled to the respective connection ports via the signal line;
acquiring, from a state-information storage unit in the information processing apparatus, state information indicating a second bus configuration of the respective connection ports to which the device is coupled;
comparing the first bus configuration and the second bus configuration by the processor;
changing the second bus configuration of the connection port based on a result of the comparing by changing a value in a port setting register;
changing the second bus configuration so as to match the first bus configuration when the first bus configuration and the second bus configuration do not match each other; and
reading, after changing the bus configuration of the respective connection ports, the value of the port setting register whose value has been changed to verify the changing and supply the reset signal to the respective connection ports individually.

5. The device connection method according to claim 4, further comprising:
resetting the respective connection ports.

6. A non-transitory computer-readable recording medium storing a program for coupling a device, the program causing a computer to execute:
acquiring, from a storage unit included in a device which receives, from a processor in an information processing apparatus, a reset signal via a signal line in the information processing apparatus, outputs, to the processor, a coupling state of whether the device is coupled to respective connection ports in the information processing apparatus via the signal line and outputs, to the processor, bus-configuration information indicating a bus configuration of the device via a sideband bus in the information processing apparatus, the bus-configuration information via the sideband bus when receiving the coupling state indicating that the device has been coupled to the respective connection port via the signal line;
acquiring state information indicating a setting state of the bus configuration of the respective connection port from a state-information storage unit;
comparing the state information with the bus-configuration information; and
changing the bus configuration of the respective connection port based on the comparing by changing a value in a port setting register;
changing the bus configuration of the respective connection ports so as to match the bus-configuration information when the state information and the bus-configuration information do not match each other; and
reading, after changing the bus configuration of the respective connection ports, the value of the port setting register whose value has been changed to verify the changing and supply the reset signal to the respective connection ports individually.

7. The non-transitory computer-readable recording medium according to claim 6, further comprising:
resetting the respective connection ports.

\* \* \* \* \*